US011392539B2

(12) United States Patent
Muramoto

(10) Patent No.: US 11,392,539 B2
(45) Date of Patent: Jul. 19, 2022

(54) CONVERSION METHOD, CONVERSION APPARATUS, AND RECORDING MEDIUM

(71) Applicant: FUJITSU LIMITED, Kawasaki (JP)

(72) Inventor: Takahide Muramoto, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/223,011

(22) Filed: Apr. 6, 2021

(65) Prior Publication Data

US 2021/0224223 A1 Jul. 22, 2021

Related U.S. Application Data

(63) Continuation of application No. PCT/JP2018/038004, filed on Oct. 11, 2018.

(51) Int. Cl.
*G06F 16/11* (2019.01)
*G06F 16/25* (2019.01)

(52) U.S. Cl.
CPC .......... *G06F 16/116* (2019.01); *G06F 16/258* (2019.01)

(58) Field of Classification Search
CPC ............................ G06F 16/116; G06F 16/258
USPC .......................................................... 707/756
See application file for complete search history.

(56) References Cited

U.S. PATENT DOCUMENTS 6,779,030 B1 * 8/2004 Dugan ................ H04Q 3/0037 379/221.08
2007/0078877 A1 4/2007 Ungar et al.
2008/0301162 A1 12/2008 Wall et al.
2012/0065944 A1 * 3/2012 Nielsen ................. G06Q 50/06 703/1

(Continued)

FOREIGN PATENT DOCUMENTS

EP 3 261 025 A1 12/2017
JP 2005-352774 A 12/2005

(Continued)

OTHER PUBLICATIONS

International Search Report and Written Opinion dated Jan. 15, 2019, received for PCT Application PCT/JP2018/038004, Filed on Oct. 11, 2018, 7 pages including English Translation.

(Continued)

*Primary Examiner* — Dung K Chau
(74) *Attorney, Agent, or Firm* — Xsensus LLP

(57) ABSTRACT

A conversion method executed by a computer includes generating another file that includes a plurality of pieces of format converted data associated with a plurality of pieces of data by applying an algorithm to the plurality of pieces of data included in the file, a process of the algorithm including associating, when identification information of pre-format-conversion data is associated with data in the plurality of pieces of data, the identification information with format converted data corresponding to the data and associating, when the identification information is not associated, newly generated identification information with the format converted data, determining whether one of the plurality of pieces of identification information is associated with a plurality of positions in the another file, and changing the identification information associated with one of the pieces of data at the plurality of positions from among the plurality of pieces of data included in the another file.

6 Claims, 9 Drawing Sheets

1
CONVERSION APPARATUS
10
CONTROL UNIT
11
FORMAT CONVERTING UNIT
12
id DUPLICATION JUDGING UNIT
13
id CHANGING UNIT
20
STORAGE UNIT
21
PRE-CONVERSION FILE
22
POST-CONVERSION FILE
23
CONVERSION INFORMATION LIST

(56) References Cited

U.S. PATENT DOCUMENTS

2012/0278694 A1 11/2012 Washio
2014/0013204 A1 1/2014 Theis et al.
2014/0181128 A1* 6/2014 Riskin ................. G06F 16/3344 707/756
2015/0127689 A1 5/2015 Inoue et al.
2017/0011297 A1* 1/2017 Li ..................... H02J 13/00002
2017/0249371 A1* 8/2017 Krupa .................... G06Q 10/10
2018/0330331 A1* 11/2018 Nair ................... G06Q 10/1053
2019/0087281 A1* 3/2019 Kumar ................ G06F 11/2094
2019/0311782 A1* 10/2019 Dai .......................... G06N 3/12
2019/0354759 A1* 11/2019 Somers ................ G06N 3/0454

FOREIGN PATENT DOCUMENTS

WO 2011/089683 A1 7/2011
WO 2014/010029 A1 1/2014

OTHER PUBLICATIONS

Extended European Search Report dated Sep. 15, 2021, in corresponding European Patent Application No. 18936342.7.

* cited by examiner

Figure 2:
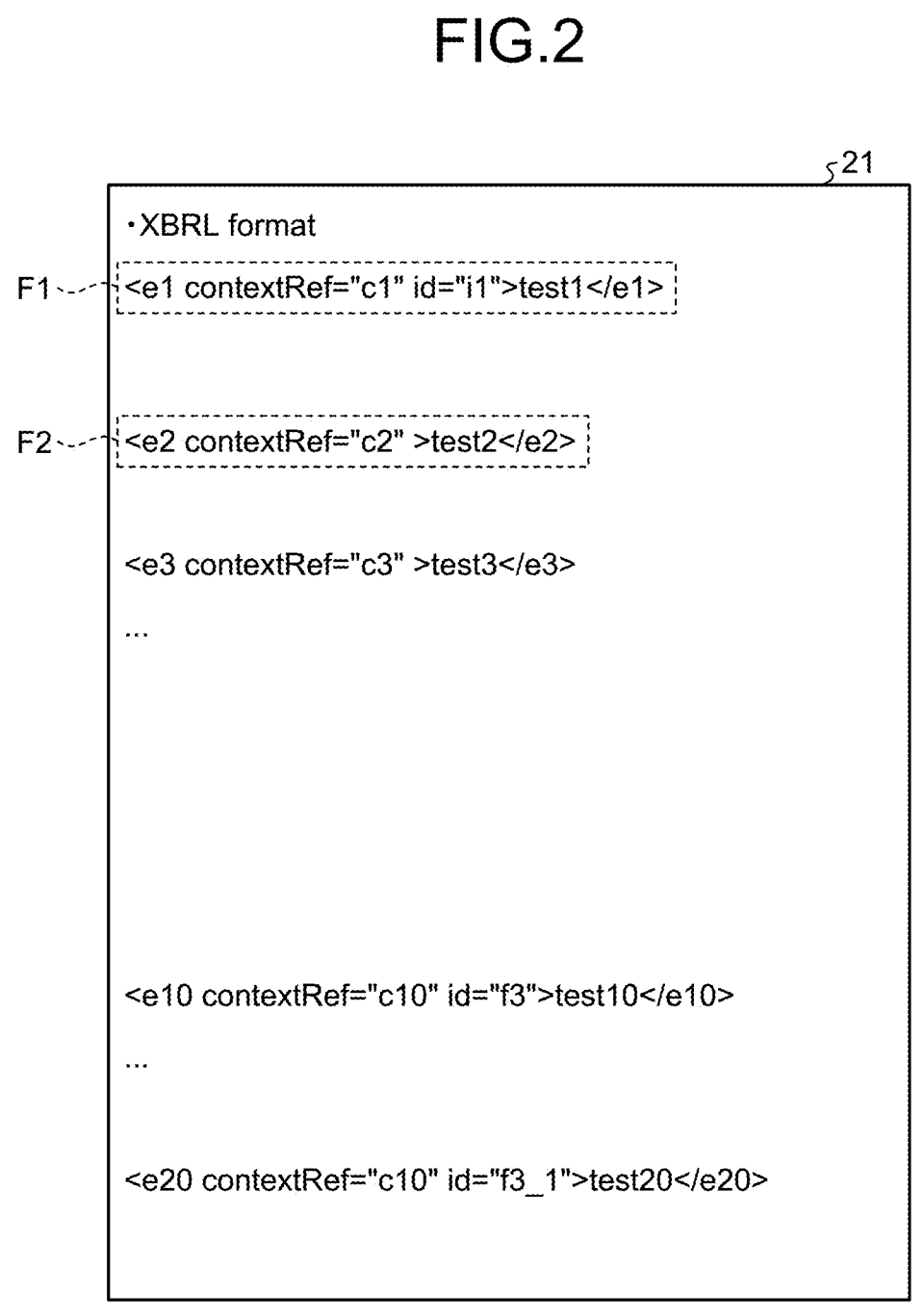

・XBRL format

F1 <e1 contextRef="c1" id="i1">test1</e1>

F2 <e2 contextRef="c2" >test2</e2>

<e3 contextRef="c3" >test3</e3>

...

<e10 contextRef="c10" id="f3">test10</e10>

...

<e20 contextRef="c10" id="f3_1">test20</e20>

•JSON format

```
"facts": {
 "i1": {
  "value": "test1",
 "f2": {
  "value": "test2",
 "f3": {
  "value": "test3",
 ...

 "f3": {
  "value": "test10",
...
 "f3_1": {
  "value": "test20",
```

| id (23a) | OFFSET (23b) | FLAG (23c) |
|---|---|---|
| i1 | 10 | 0 |
| f2 | 20 | 1 |
| f3 | 35 | 1 |
| f3 | 45 | 0 |
| f3_1 | 60 | 0 |
| : | : | : |

21
・XBRL format
<e1 contextRef="c1" id="i1">test1</e1>
<e2 contextRef="c2" >test2</e2>
<e3 contextRef="c3" >test3</e3>
...
<e10 contextRef="c10" id="f3">test10</e10>
...
<e20 contextRef="c10" id="f3_1">test20</e20>
S100
S110
S120
S130
S140
22
・JSON format
"facts": {
"i1": {
"value": "test1",
"f2": {
"value": "test2",
"f3": {
"value": "test3",
...
"f3": {
"value": "test10",
...
"f3_1": {
"value": "test20",
23
id OFFSET FLAG
i1 10 0
f2 20 1
f3 35 1
f3 45 0
f3_1 60 0
: : :
S105
S115
S125
S135
S145

21
PRE-CONVERSION FILE
S300
22
POST-CONVERSION FILE
S320
CONVERSION INFORMATION LIST
23
id OFFSET
i1 10
f2 20
f3 35
f3 45
f3_1 60
S310

CONVERSION METHOD, CONVERSION APPARATUS, AND RECORDING MEDIUM

CROSS-REFERENCE TO RELATED APPLICATION

This application is a continuation application of International Application PCT/JP2018/038004, filed on Oct. 11, 2018, and designating the U.S., the entire contents of which are incorporated herein by reference.

FIELD

The present invention relates to a conversion method and the like.

BACKGROUND

Financial statements using Extensible Business Reporting Language (XBRL) are obliged to submit to the Financial Service Agency. XBRL is a language developed based on Extensible Markup Language (XML) as a data description language used for easily generating, distributing, and using business reports.

Data of the financial statements in an XBRL data format is commonly converted to data in another data format. Examples of the other data format includes a JavaScript (registered trademark) Object Notation (JSON) data format, an XML data format, and a Comma-Separated Values (CSV) data format.

In the standard specifications for converting a data format from XBRL to JSON, a fact of data in a JSON format is obliged to always have an id (identifier). Therefore, when an id is omitted in the fact of the data in the XBRL format, a new id is assigned to the fact of the data in the JSON format based on the generating rule of an id. The new id is assigned so as not to be duplicated with an existing id.

In the conversion of the data format from XBRL to JSON, an information processing apparatus that performs conversion loads all of the pieces of data in the XBRL format into a memory as a model tree. Then, the information processing apparatus searches for a fact by sequentially tracing, from the root to descendants, the model tree loaded into the memory, and, judges, when a fact is detected, whether an id is present. Then, if an id is present, the information processing apparatus converts the fact to the JSON format. In contrast, if an id is not present, the information processing apparatus generates a new id and judges whether duplicated new ids are present by sequentially tracing the model tree loaded into the memory from the root to the descendants. Then, if the new id is duplicated, the information processing apparatus corrects the new id and judges whether the corrected new id is duplicated. Then, if the new id is not duplicated, the information processing apparatus converts the fact to the JSON format. The information processing apparatus repeats the processes between searching for a fact to converting the fact until all of the facts have been converted.

Patent Document 1: International Publication Pamphlet No. WO 2011/089683

SUMMARY

According to an aspect of the embodiments, a conversion method executed by a computer includes: generating another file that includes a plurality of pieces of format converted data associated with a plurality of pieces of data by applying an algorithm to the plurality of pieces of data included in the file, a process of the algorithm including: associating, when identification information of pre-format-conversion data is associated with data in the plurality of pieces of data, the identification information with format converted data corresponding to the data; and associating, when the identification information is not associated, newly generated identification information with the format converted data; determining, by referring to relationship information between the identification information associated with each of the plurality of pieces of data included in the other file and a position of each of the plurality of pieces of data in the other file, whether one of the plurality of pieces of identification information is associated with a plurality of positions in the another file; and changing, when one of the plurality of pieces of identification information is associated with the plurality of positions in the another file, the identification information associated with one of the pieces of data at the plurality of positions from among the plurality of pieces of data included in the another file.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a pre-conversion file;

FIG. 3 is a diagram illustrating an example of a post-conversion file;

FIG. 4 is a diagram illustrating an example of a data structure of a conversion information list according to the embodiment;

DESCRIPTION OF EMBODIMENTS

However, in the related conversion of the data format from XBRL to JSON, there is a problem in that memory capacity is needed to perform a duplication check on a new id. For example, in the conversion of data format from XBRL to JSON, the information processing apparatus loads all of the pieces of data in the XBRL format into the memory as a model tree, sequentially searches for a fact from the root, performs the duplication check of the id of the fact, and converts the fact to the JSON format. In order to perform such a duplication check of the id, memory capacity with an amount corresponding to a little less than about five times the data size in the XBRL format is needed. Accordingly, in the conversion of the data format from XBRL to JSON, the memory capacity is needed to perform the duplication check of a new id.

Furthermore, the problem described above occurs not only in a case of converting the data format from XBRL to JSON but also in a case of format conversion of electronic data, such as a case of converting a data format from XBRL to XML and a case of converting a data format from XBRL to CSV.

In one aspect, the embodiments provide a conversion method, a conversion apparatus, and a conversion program that can suppress the memory capacity needed to perform duplication check on an id associated with format converted data.

Preferred embodiments of a conversion method, a conversion apparatus, and a conversion program disclosed in the present invention will be explained in detail below with reference to the accompanying drawings. Furthermore, the present invention is not limited to the embodiments.

EMBODIMENT

[Configuration of a Conversion Apparatus According to an Embodiment]

Figure 1:
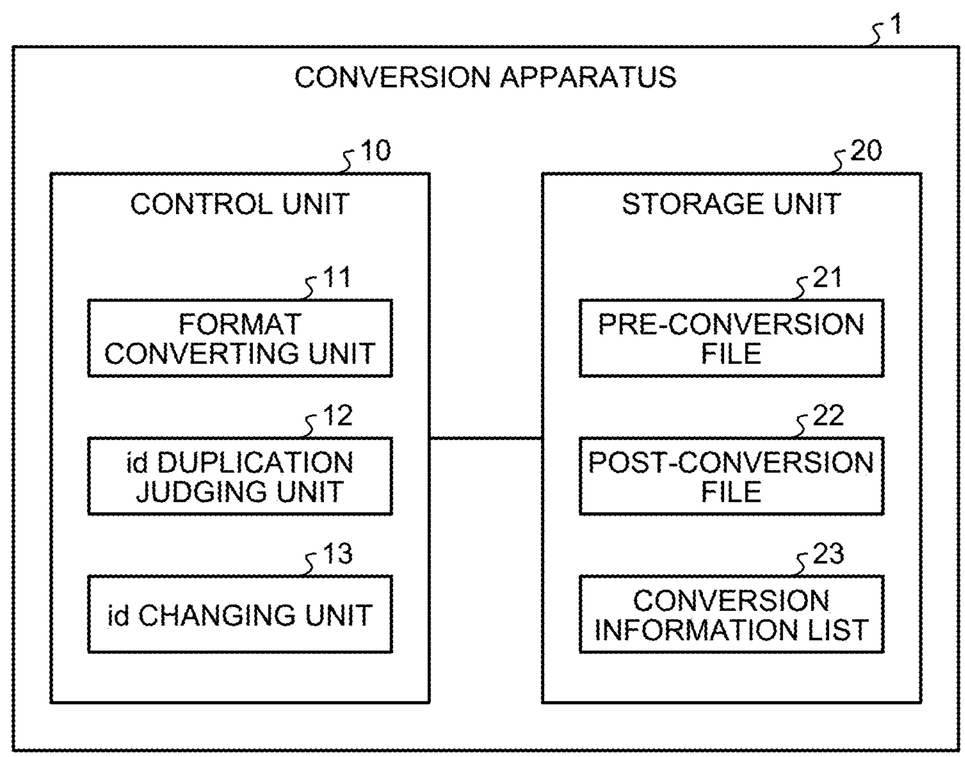
FIG. 1 is a functional block diagram illustrating a conversion apparatus according to an embodiment.

FIG. 1 is a functional block diagram illustrating a configuration of a conversion apparatus according to an embodiment. As illustrated in FIG. 1, a conversion apparatus 1 converts a plurality of pieces of data included in a file of data in an XBRL format. For example, the conversion apparatus 1 performs format conversion on each of the pieces of data included in the file in the XBRL format data and generates another file in which an id (identifier) of the data is associated with each of the pieces of converted data. When the id of the converted data is associated with the XBRL format data, this id is associated with the converted data. When the id of the converted data is not associated with the XBRL format data, a newly generated id is associated with the converted data. Then, the conversion apparatus 1 refers to relationship information indicating between the id associated with each of the plurality of pieces of data included in the other file and the position of each of the plurality of pieces of data in the other file and performs duplication judgement on the id of the plurality of pieces of data included in the other file. When the ids are duplicated, the conversion apparatus 1 changes the duplicated ids. The file of the XBRL format data indicates, for example, a file of financial statements. The other file includes, for example, a file of JSON format data, a file of XML format data, or a file of CSV format data. Furthermore, in the following, a description will be given, as an example, in which a file of XBRL format data on financial statements is converted to a file of JSON format data as another file.

The conversion apparatus 1 includes a control unit 10 and a storage unit 20.

The control unit 10 includes an internal memory that stores therein control data and programs in which various kinds of procedures are prescribed, whereby the control unit 10 executes various processes. Furthermore, the control unit 10 corresponds to, for example, an integrated circuit, such as an application specific integrated circuit (ASIC), a field programmable gate array (FPGA), or the like, or corresponds to an electronic circuit, such as a central processing unit (CPU), a micro processing unit (MPU), or the like. Furthermore, the control unit 10 includes a format converting unit 11, an id duplication judging unit 12, and an id changing unit 13. Furthermore, the format converting unit 11 is an example of a generating unit. The id duplication judging unit 12 is an example of a judging unit. The id changing unit 13 is an example of a changing unit.

The storage unit 20 is, for example, a storage device, such as a nonvolatile semiconductor memory device including a flash memory, a ferroelectric random access memory (FRAM) (registered trademark), and the like. Furthermore, the storage unit 20 includes a pre-conversion file 21, a post-conversion file 22, and a conversion information list 23.

The pre-conversion file 21 is a file of financial statements and is, in the embodiment, a file of the XBRL format data. In the following, an example of the pre-conversion file 21 will be described with reference to FIG. 2. FIG. 2 is an example of the pre-conversion file. As illustrated in FIG. 2, the pre-conversion file 21 is a file described in an XBRL format. In the pre-conversion file 21, a plurality of pieces of data is described. Such data is a synonym of a "fact". The fact is a unit of data that is read from the pre-conversion file 21 or that is written to the post-conversion file 22 that will be described later.

As an example, in the fact indicated by a code F1, "e1" is described as an element name and "test1" is described as a value of the element. In this fact, an id is present and "i1" is described as an id. In the fact indicated by a code F2, "e2" is described as an element name and "test2" is described as a value of the element. In this fact, an id is omitted.

A description will be given here by referring back to FIG. 1. The post-conversion file 22 is a file obtained by converting the format of the pre-conversion file 21 and is, in the embodiment, a file of JSON format data. In the standard specification of conversion from the XBRL format to the JSON format, the fact in the JSON format is obliged to always have an id. Accordingly, when an id is omitted from the fact in the XBRL format, a new id is generated for the fact in the JSON format based on the generating rule. The id of the fact in the JSON format is used to trace the fact in the XBRL format associated with the fact in the JSON format. In other words, the id of the fact in the JSON format is used to check whether a deficiency of a fact is present in the file of the JSON format data or whether conversion is correctly performed.

The generating rule of the id mentioned here is defined as <1> and <2> described below. The generating rule <1> indicates that a new id is set to be "fnn_mm". "f" denotes a prefix. nn denotes a serial number of a fact, and mm denotes an auxiliary serial number that is used in a case in which a serial number of a fact is duplicated. The generating rule <2> indicates that a new id is not duplicated to an existing id. The existing id mentioned here indicates an id that is already described in the pre-conversion file 21. Furthermore, the post-conversion file 22 is generated by, for example, the format converting unit 11.

In the following, an example of the post-conversion file 22 will be described with reference to FIG. 3. FIG. 3 is a diagram illustrating an example of a post-conversion file. As illustrated in FIG. 3, the post-conversion file 22 is a file described in the JSON format. In the post-conversion file 22, a plurality of facts is described. For example, the fact indicated by a code F1' is associated with the fact indicated by the code F1 illustrated in FIG. 2. Namely, the fact indicated by the code F1' is the fact obtained by converting the fact in the XBRL format indicated by code F1 to the JSON format. The id of the fact in the XBRL format is reflected onto the id. The fact indicated by a code F2' is associated with the fact indicated by the code F2 illustrated in FIG. 2. Namely, the fact indicated by the code F2' is the fact obtained by converting the fact in the XBRL format indicated by the code F2 to the JSON format. A new id is generated for the id.

A description will be given here by referring back to FIG. 1. The conversion information list 23 is relationship information between an id associated with each of the plurality of pieces of data included in the post-conversion file 22 and the position of each of the plurality of pieces of the data in the post-conversion file 22. Furthermore, the conversion information list 23 is generated by, for example, the format converting unit 11.

In the following, an example of the data structure of the conversion information list 23 will be described with reference to FIG. 4. FIG. 4 is a diagram illustrating an example of the data structure of the conversion information list according to the embodiment. As illustrated in FIG. 4, the conversion information list 23 is a list in which an id 23*a*, an offset 23*b*, and a flag 23*c* are associated. The id 23*a* is identification information associated with each of the pieces of data included in the post-conversion file 22. The offset 23*b* indicates the relative position from the top of the post-conversion file 22 to the id. A description has been given of a case in which the offset 23*b* indicates the relative position from the top of the post-conversion file 22 to the id; however, the case is not limited to this and the relative position may also be a position from a specific position other than the top of the post-conversion file 22 to the id. The offset 23*b* is used to find the position of the id included in the post-conversion file 22. The flag 23*c* is a flag for identifying whether the id 23*a* is an existing id described in the pre-conversion file 21 or whether the id 23*a* is not present in the pre-conversion file 21 but is a newly generated id. In a case of an existing id, for example, "0" is set to the flag 23*c*. In a case of a newly generated id, for example, "1" is set to the flag 23*c*.

As an example, when the id 23*a* is "i1", "10" is set as the offset 23*b* and "0" is set as the flag 23*c*. When the id 23*a* is "f2", "20" is set as the offset 23*b* and "1" is set as the flag 23*c*.

A description will be given here by referring back to FIG. 1. The format converting unit 11 generates the post-conversion file 22 by performing format conversion on the data in the pre-conversion file 21. For example, the format converting unit 11 acquires data (fact) from the pre-conversion file 21. When an id of the acquired data is associated with the acquired data, the format converting unit 11 associates the id with the format converted data. When the id of the acquired data is not associated with the acquired data, the format converting unit 11 generates a new id and associates the newly generated id with the format converted data. The new id is generated based on the generating rule <1> of the id described above. Namely, the format converting unit 11 generates, as the new id, "fnn" ("f" denotes a prefix and "nn" denotes a serial number of the fact) including the next serial number of the serial number that is allocated to the id of the data located immediately before. The format converting unit 11 adds the data with the attached id to the post-conversion file 22. Then, the format converting unit 11 associates the id, the offset from the top of the post-conversion file 22 to the id of the format converted data, and the flag associated with the id, and then, registers the associated information in the conversion information list 23. When the format converting unit 11 acquires the next data from the pre-conversion file 21, the format converting unit 11 performs a format conversion process on the acquired data and repeats the process until the format converting unit 11 is not able to acquire the next data.

The id duplication judging unit 12 refers to the conversion information list 23 and judges whether duplication of the id is present. For example, the id duplication judging unit 12 acquires a new id and an offset from the conversion information list 23. As an example, the id duplication judging unit 12 acquires, from the top of the conversion information list 23 to the terminal point, an id and an offset that are associated with "1" indicating a new id by the flag 23*c*. The id duplication judging unit 12 refers to the conversion information list 23 and judges whether a duplicated existing id is present in the acquired new id. Furthermore, when the new id is changed by the id changing unit 13, which will be described later, the id duplication judging unit 12 further refers to the conversion information list 23 and judges whether an existing id duplicated with the changed new id is present.

If duplication occurs in the ids, the id changing unit 13 changes the subject id to an id that is not duplicated. For example, when it is judged, by the id duplication judging unit 12, that an existing id that is duplicated with the new id is present, the id changing unit 13 changes the new id to an id that is not duplicated with the existing id. The id is changed based on the generating rule <1> of the id described above. Namely, the id changing unit 13 changes the new id by attaching the auxiliary serial number "_mm" (mm denotes an auxiliary serial number) to the new id.

Furthermore, the id changing unit 13 reflects the changed id in the post-conversion file 22 and the conversion information list 23. For example, when it is judged, by the id duplication judging unit 12, that an existing id that is duplicated with the changed new id is not present, the id changing unit 13 corrects the new id that is positioned at the offset acquired from the conversion information list 23 of the post-conversion file 22 to the changed new id. In addition, the id changing unit 13 corrects, regarding the conversion information list 23, the acquired target id to the changed new id and corrects the offsets associated with the ids subsequent to the acquired target id in accordance with the number of characters of the changed new id. As an example, when the new id is "f3", if the new id is changed to "f3_1", the id changing unit 13 may correct the offset 23*b* associated with the id 23*a* subsequent to the new id to the value obtained by adding the number of characters corresponding to two characters corresponding to the added "_1".

[Example of Flow of Format Conversion Process]

Figure 5:
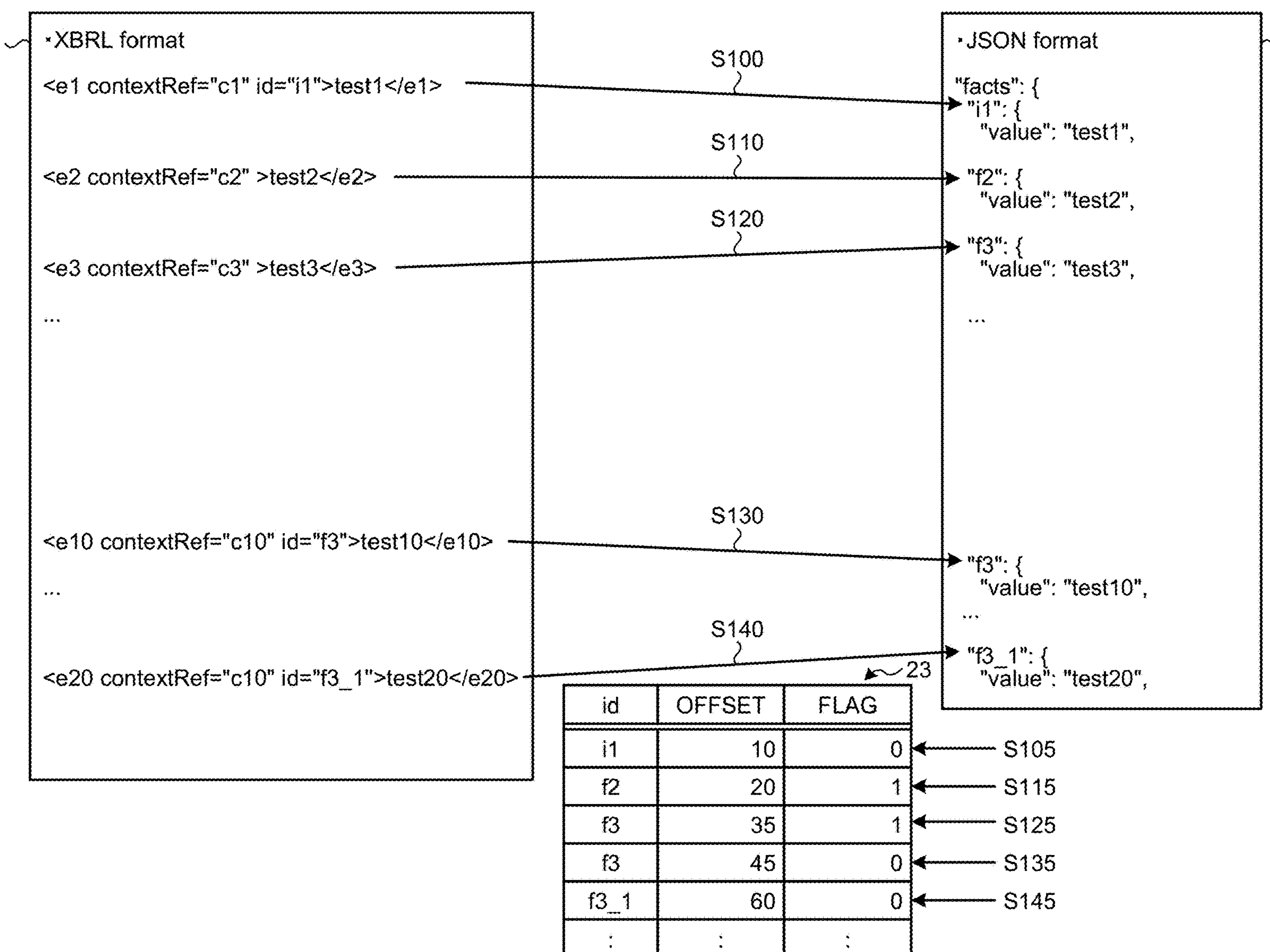
FIG. 5 is a diagram illustrating an example of the flow of a format conversion process according to the embodiment.

FIG. 5 is a diagram illustrating an example of the flow of the format conversion process according to the embodiment. Furthermore, in FIG. 5, the pre-conversion file 21 is a file in the XBRL format and the post-conversion file 22 is a file in the JSON format.

The format converting unit 11 acquires a fact from the pre-conversion file 21 and judges whether an id is associated with the acquired fact. If the id is associated with the acquired fact, the format converting unit 11 associates the subject id with a format converted fact. If the id is not associated with the acquired fact, the format converting unit 11 generates a new id and associates the generated new id with the format converted fact. Then, the format converting unit 11 associates the id, the offset from the top of the post-conversion file 22 to the id, and the flag, and then, registers the associated data in the conversion information list 23.

Here, the format converting unit 11 reads the fact, from the pre-conversion file 21, that indicates the top element name of "e1". Because "id="i1"" is described in this fact, the id is associated. Accordingly, the format converting unit 11 associates "i1" as the id with the format converted fact. The format converting unit 11 writes, to the post-conversion file 22, the fact to which the id is attached (S100). Then, the format converting unit 11 associates "i1" as the id 23*a*, "10" as the offset 23*b*, "0" as the flag 23*c* and registers the associated data in the conversion information list 23 (S105). Furthermore, the value of the offset 23*b* is an example.

In the following, the format converting unit 11 reads, from the pre-conversion file 21, the fact that indicates the top element name of "e2". An id is not described in this fact. Accordingly, the format converting unit 11 generates a new id "f2" in accordance with the generating rule of an id. Namely, the format converting unit 11 generates, as a new id, "f2" including the serial number "2" next to the serial number "1" that is allocated to immediately before the id "i1". Then, the format converting unit 11 associates the generated id "f2" with the format converted fact. The format converting unit 11 writes the fact with the id attached into the post-conversion file 22 (S110). Then, the format converting unit 11 associates "f2" as the id 23*a*, "20" as the offset 23*b*, "1" that indicates a new id as the flag 23*c* and registers the associated data in the conversion information list 23 (S115). Furthermore, the value of the offset 23*b* is an example.

Then, the format converting unit 11 reads, from the pre-conversion file 21, the fact in which the top element name indicates "e3". An id is not described in this fact. Accordingly, the format converting unit 11 generates a new id "f3" in accordance with the generating rule of an id. Namely, the format converting unit 11 generates, as a new id, "f3" including the serial number "3" next to the serial number "2" that is allocated to immediately before id "f2". Then, the format converting unit 11 associates the generated id "f3" with the format converted fact. The format converting unit 11 writes the fact with the id attached into the post-conversion file 22 (S120). Then, the format converting unit 11 associates "f3" as the id 23*a*, "35" as the offset 23*b*, "1" indicating a new id as the flag 23*c* and registers the associated data in the conversion information list 23 (S125). Furthermore, the value of the offset 23*b* is an example.

Then, the format converting unit 11 reads the fact in which the top element name indicates "e10" from the pre-conversion file 21. Because "id="f3"" is described in this fact, an id is associated. Accordingly, the format converting unit 11 associates "f3" as the id with the format converted fact. The format converting unit 11 writes the fact with the id attached into the post-conversion file 22 (S130). Then, the format converting unit 11 associates "f3" as the id 23*a*, "45" as the offset 23*b*, "0" as the flag 23*c* and registers the associated data in the conversion information list 23 (S135). Furthermore, the value of the offset 23*b* is an example.

Then, the format converting unit 11 reads, from the pre-conversion file 21, the fact in which the top element name indicates "e20". Because "id="f3_1"" is described in this fact, an id is associated. Accordingly, the format converting unit 11 associates "f3_1" as the id to the format converted fact. The format converting unit 11 writes the fact with the id attached into the post-conversion file 22 (S140). Then, the format converting unit 11 associates "f3_1" as the id 23*a*, "60" as the offset 23*b*, "0" as the flag 23*c* and registers the associated data in the conversion information list 23 (S145). Furthermore, the value of the offset 23*b* is an example.

[Example of Flow of Id Duplication Judging Process and Id Changing Process]

Figure 6:
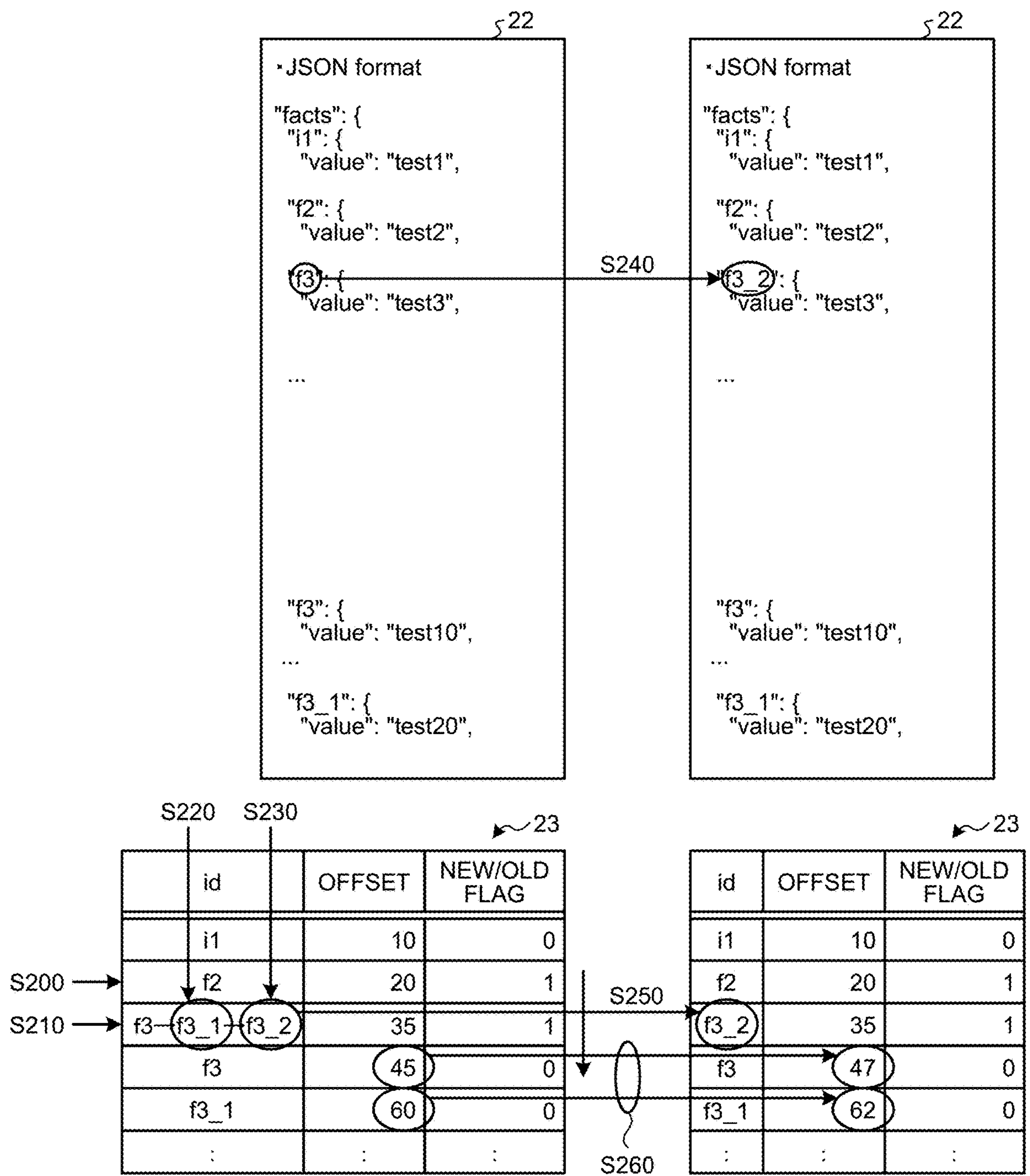
FIG. 6 is a diagram illustrating an example of the flow of an id duplication judging process and an id conversion process according to the embodiment.

FIG. 6 is a diagram illustrating the flow of an id duplication judging process and an id changing process according to the embodiment. Furthermore, in FIG. 6, the id duplication judging process and the id conversion process performed on the post-conversion file 22 illustrated in FIG. 5 will be described.

The id duplication judging unit 12 acquires, from the top of the conversion information list 23 toward the terminal point, the ids and the offsets associated with "1" that indicates a new id indicated by the flag 23*c*. The id duplication judging unit 12 refers to the conversion information list 23 and judges whether duplication of the acquired new id is present. Then, if duplication of the new id is present, the id changing unit 13 changes the subject id to an id that is not duplicated. Then, the id changing unit 13 reflects the changed id in the post-conversion file 22 and the conversion information list 23.

Here, the id duplication judging unit 12 acquires, from the top of the conversion information list 23 toward the terminal point, the new id "f2" and the offset "20" associated with "1" indicated by the flag 23*c*. The id duplication judging unit 12 refers to the conversion information list 23 and judges whether an existing id duplicated with the new id "f2" is present (S200). In the conversion information list 23, there is no existing id that is duplicated with the new id "f2".

Then, the id duplication judging unit 12 acquires, from the new id "f2" toward the terminal point in the conversion information list 23, the new id "f3" and an offset "35" associated with "1" indicated by the flag 23*c*. The id duplication judging unit 12 refers to the conversion information list 23 judges whether an existing id duplicated with the new id "f3" is present (S210). In the conversion information list 23, the existing id duplicated with the new id "f3" is present in another record. Thus, because duplication with the new id "f3" is present, the id changing unit 13 changes the new id "f3" to "f3_1" in accordance with the generating rule of an id. Namely, the id changing unit 13 changes the id to "f3_1" by adding an auxiliary serial number "_1" to the new id "f3".

Then, the id duplication judging unit 12 refers to the conversion information list 23 and judges whether an existing id that is duplicated with the changed new id "f3_1" (S220). In the conversion information list 23, the existing id that is duplicated with the changed new id "f3_1" is present in another record. Thus, because duplication of the id "f3_1" is present, the id changing unit 13 changes the new id "f3_1" that has been changed in accordance with the generating rule of an id to "f3_2". Namely, the id changing unit 13 the changes id to "f3_2" by changing the auxiliary serial number "_2" from the new id "f3_1".

Then, the id duplication judging unit 12 refers to the conversion information list 23 and judges whether an existing id that is duplicated with the changed new id "f3_2" (S230). In the conversion information list 23, an existing id that is duplicated with the changed new id "f3_2" is not present in the other record.

Then, the id changing unit 13 corrects the new id "f3" positioned at the offset "35" acquired from the conversion information list 23 for the post-conversion file 22 to the changed new id "f3_2" (S240). In addition, the id changing unit 13 corrects, regarding the conversion information list 23, the id 23*a* from "f3" to "f3_2" (S250). Because the id 23*a* is changed from "f3" to "f3_2", the id changing unit 13 corrects the offset 23*b* associated with the id 23*a* that is subsequent to the new id "f3_2" to the value obtained by adding the number of characters corresponding to two (S260). The offset 23*b* associated with "f3" as the id 23*a* is corrected from "45" to "47". The offset 23*b* associated with "f3_1" as the id 23*a* is corrected from "60" to "62". Then, continuously, the id duplication judging unit 12 may repeat the duplication judgement of the new ids subsequent to the changed new id “f3_2”.

Consequently, the conversion apparatus 1 can suppress the memory capacity needed to perform a duplication check on the id associated with the format converted fact. Namely, by judging duplication of ids by using the conversion information list 23 without loading all of the facts in the XBRL format into the memory, the conversion apparatus 1 can suppress the memory capacity needed to perform a duplication check on the id associated with the format converted fact.

Furthermore, a description has been given of a case in which the id duplication judging unit 12 performs duplication judgement on the ids from the top of the conversion information list 23 toward the terminal point. However, the duplication judgement is not limited to this and the id duplication judging unit 12 may also perform the duplication judgement of the ids from the terminal point of the conversion information list 23 toward the top. In this case, the id duplication judging unit 12 refers to the conversion information list 23 and judges whether an existing id that is duplicated with the new id is present. If a duplicated id is present, the id changing unit 13 changes the subject id to an id that is not duplicated with the subject id and reflects the changed id in the post-conversion file 22 and the conversion information list 23. At this time, the id changing unit 13 does not need to correct the offset 23*b* associated with the ids subsequent to the id to be changed in the conversion information list 23. This is because duplication judgement has been subjected to the ids subsequent to the id to be changed and an offset is not used. Consequently, even when the id changing unit 13 changes an id, the id changing unit 13 can thus perform the id changing process at high speed without correcting the offset.

[Flowchart of Format Conversion Process]

Figure 7:
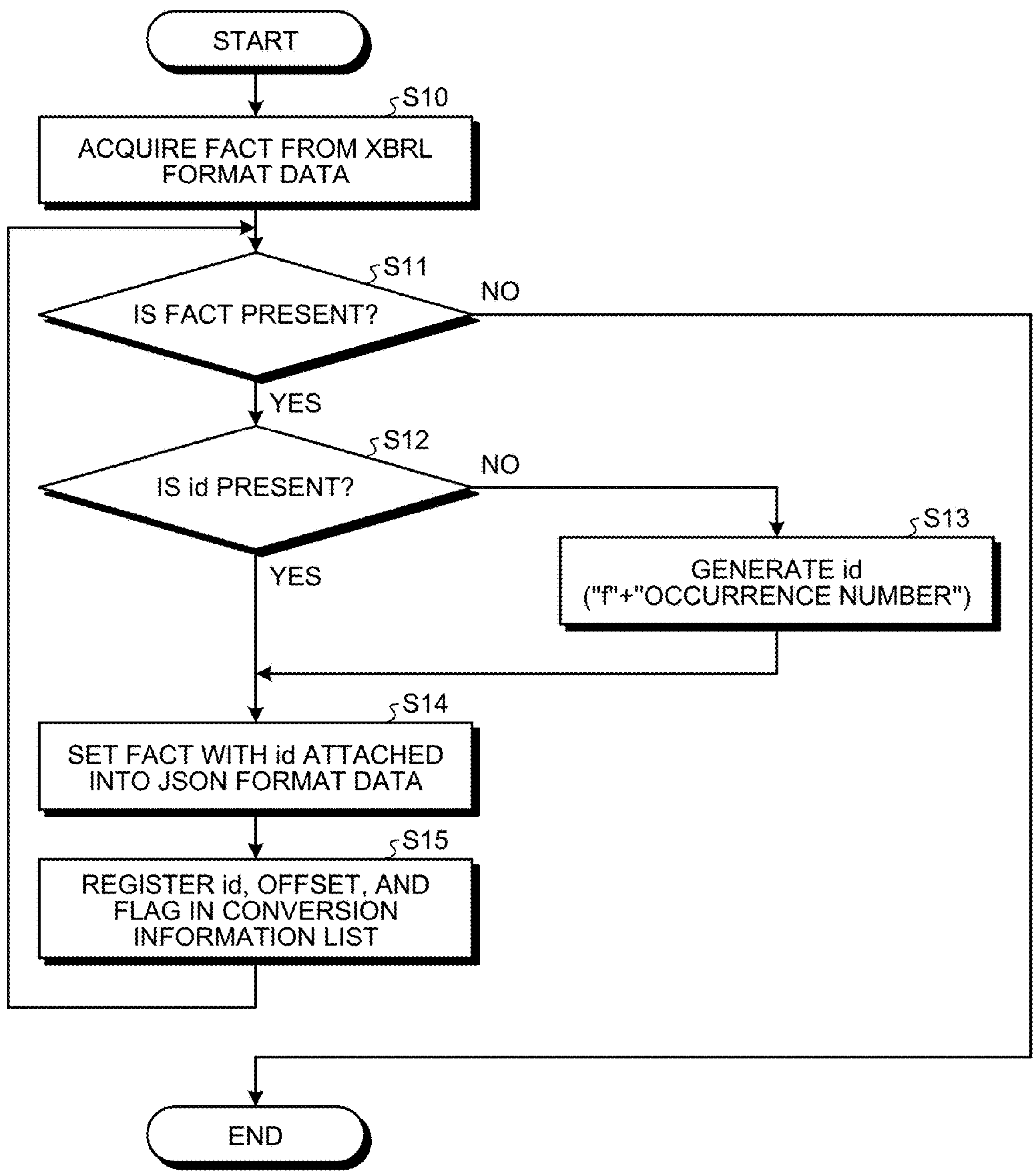
FIG. 7 is a flowchart illustrating an example of the format conversion process according to the embodiment.

In the following, an example of the flowchart of the format conversion process performed by the format converting unit 11 will be described with reference to FIG. 7. FIG. 7 is a diagram illustrating an example of the flowchart of the format conversion process according to the embodiment. Furthermore, in FIG. 7, the pre-conversion file 21 is assumed to be the file of the XBRL format data and the post-conversion file 22 is assumed to be the file of the JSON format data. First, the format converting unit 11 acquires a fact from the file of the XBRL format data (Step S10).

The format converting unit 11 judges whether a fact is present (Step S11). If it is judged that a fact is present (Yes at Step S11), the format converting unit 11 judges whether an id of the subject fact is present in the fact (Step S12). If it is judged that an id of the subject fact is present in the fact (Yes at Step S12), the format converting unit 11 moves to Step S14.

In contrast, if it is judged that an id of the subject fact is not present in the fact (No at Step S12), the format converting unit 11 generates a new id in accordance with the generating rule of an id (Step S13). Namely, the format converting unit 11 generates a new id to which an occurrence number (serial number) is attached to “f”. The serial number indicates the serial number that is next to the serial number allocated to the id that is located immediately before. Then, the format converting unit 11 moves to Step S14. In Step S14, the format converting unit 11 sets the fact in which the id is attached to the JSON format data into the file of the JSON format data (Step S14).

Then, the format converting unit 11 registers the id, the offset, and the flag in the conversion information list 23 (Step S15). For example, a relative position from the top of the file of the JSON format data to the id of the target fact is set to the offset. In a case of a newly generated id, a flag value (for example “1”) indicating that the id is newly generated is set to the flag, and, in a case of an existing id, a flag value (for example “0”) indicating that the id is the existing id is set. Then, the format converting unit 11 moves to Step S11 in order to perform the process on the next fact. If it is judged, at Step S11, that a fact is not present (No at Step S11), the format converting unit 11 ends the format conversion process.

[Flowchart of Format Conversion Process]

Figure 8:
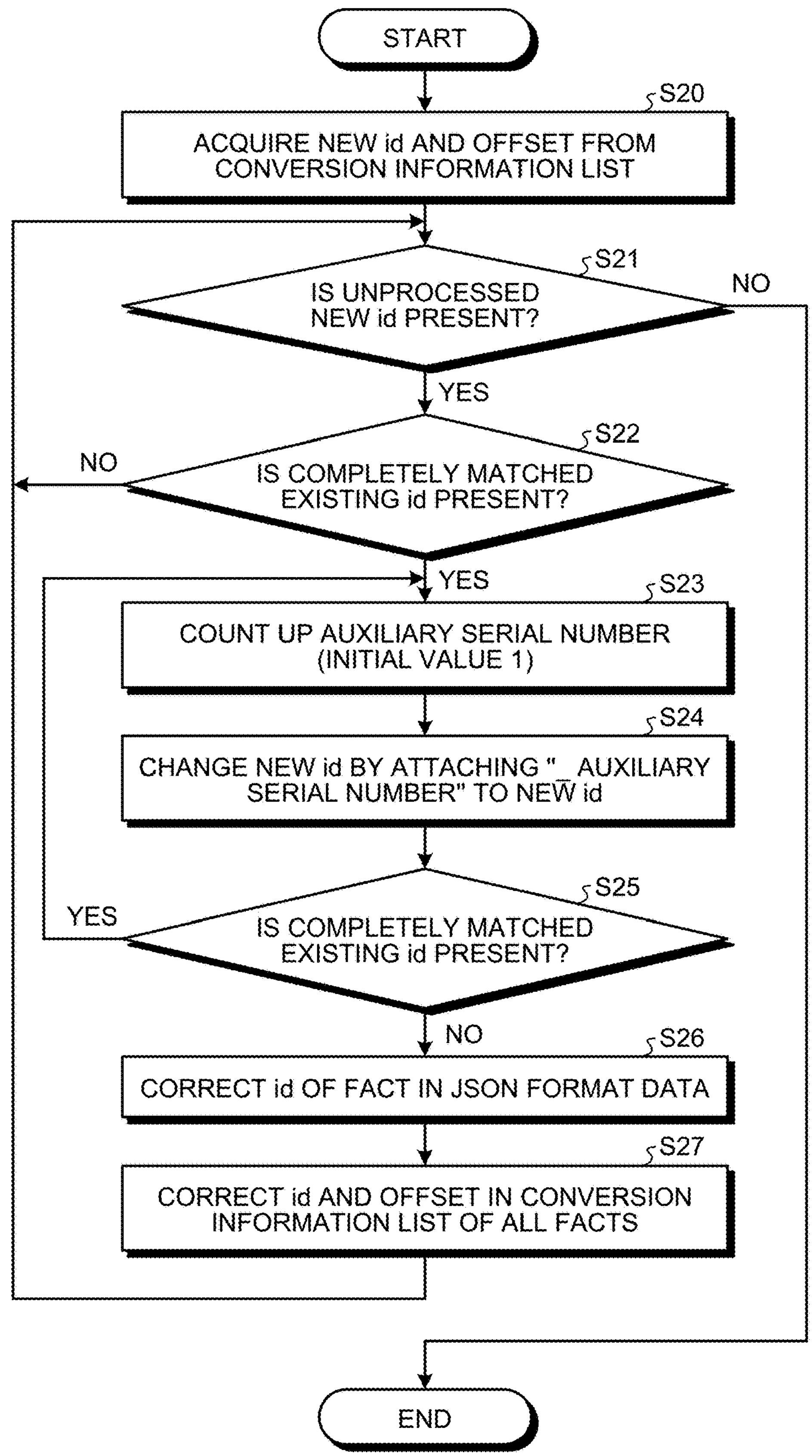
FIG. 8 is a flowchart illustrating an example of the id duplication judging process and the id changing process according to the embodiment.

In the following, an example of the flowchart of the id duplication judging process performed by the id duplication judging unit 12 and the id changing process performed by the id changing unit 13 will be described with reference to FIG. 8. FIG. 8 is a diagram illustrating an example of the flowchart of the id duplication judging process and the id changing process according to the embodiment. Furthermore, in FIG. 8, it is assumed that the pre-conversion file 21 is the file in the XBRL format data and the post-conversion file 22 is the file in the JSON format data.

First, the id duplication judging unit 12 acquires a new id and an offset from the conversion information list 23 (Step S20). For example, the id duplication judging unit 12 acquires the id and the offset associated with the flag value (for example “1”) indicating that the flag 23*c* is a new id from the top of the conversion information list 23 toward the terminal point.

The id duplication judging unit 12 judges whether an unprocessed new id is present (Step S21). If it is judged that an unprocessed new id is present (Yes at Step S21), the id duplication judging unit 12 refers to the conversion information list 23 and judges whether an existing id that is completely matched with the new id is present (Step S22). If it is judged that an existing id that is completely matched with the new id is not present (No at Step S22), the id duplication judging unit 12 moves to Step S21 in order to judge the next new id.

In contrast, if it is judged that an existing id that is completely matched with the new id is present (Yes at Step S22), the id changing unit 13 counts up the auxiliary serial number (initial value “1”) associated with the subject id (Step S23). Then, the id changing unit 13 changes, in accordance with the generating rule for an id, the new id by attaching “auxiliary serial number” to the new id (Step S24).

Furthermore, the id duplication judging unit 12 refers to the conversion information list 23 and judges whether an existing id that is completely matched with the changed new id is present (Step S25). If it is judged that an existing id that is completely matched with the changed new id is present (Yes at Step S25), the id duplication judging unit 12 moves to Step S23 in order to allow the id changing unit 13 to change the new id.

In contrast, if it is judged that an existing id that is completely matched with the changed new id is not present (No at Step S25), the id changing unit 13 corrects the id of the fact of the file of the JSON format data (Step S26). For example, the id changing unit 13 corrects the id located at the offset acquired from the conversion information list 23 of the file of the JSON format data to the changed new id.

Then, the id changing unit 13 corrects the id and the offset in the conversion information list 23 (Step S27). For example, the id changing unit 13 corrects, regarding the conversion information list 23, the target new id to the changed new id and corrects the offset associated with the ids subsequent to the target new id so as to be matched with the number of characters of the changed new id. Then, the id changing unit 13 moves to Step S21 in order to allow the id duplication judging unit 12 to judge the next new id. If it is judged, at Step S21, that an unprocessed new id is not present (No at Step S21), the id duplication judging unit 12 ends the id duplication judging process.

Effect of the Embodiment

According to the embodiment, the conversion apparatus 1 converts the format of a plurality of pieces of data included in the file. If identification information of the subject data is associated with the data in the pre-conversion file 21, the conversion apparatus 1 associates the subject identification information with the format converted data and, if the identification information is not associated, the conversion apparatus 1 applies an algorithm for associating newly generated identification information with the format converted data to the plurality of pieces of data included in the pre-conversion file 21. The conversion apparatus 1 generates another file (the post-conversion file 22) including a plurality of pieces of format converted data associated with the plurality of pieces of applied data. The conversion apparatus 1 refers to relationship information (the conversion information list 23) between the identification information associated with each of the plurality of pieces of data included in the other file and the position of each of the plurality of pieces of data in the other file and judges whether one of the pieces of the identification information is associated with the plurality of positions included in the other file. Then, if one of the pieces of identification information is associated with the plurality of positions included in the other file, the conversion apparatus 1 changes, from among the plurality of pieces of data included in the other file, the identification information associated with one of the pieces of data at the plurality of positions. According to this configuration, the conversion apparatus 1 can suppress the memory capacity needed to perform a duplication check on the identification information associated with the format converted data.

Figure 9:
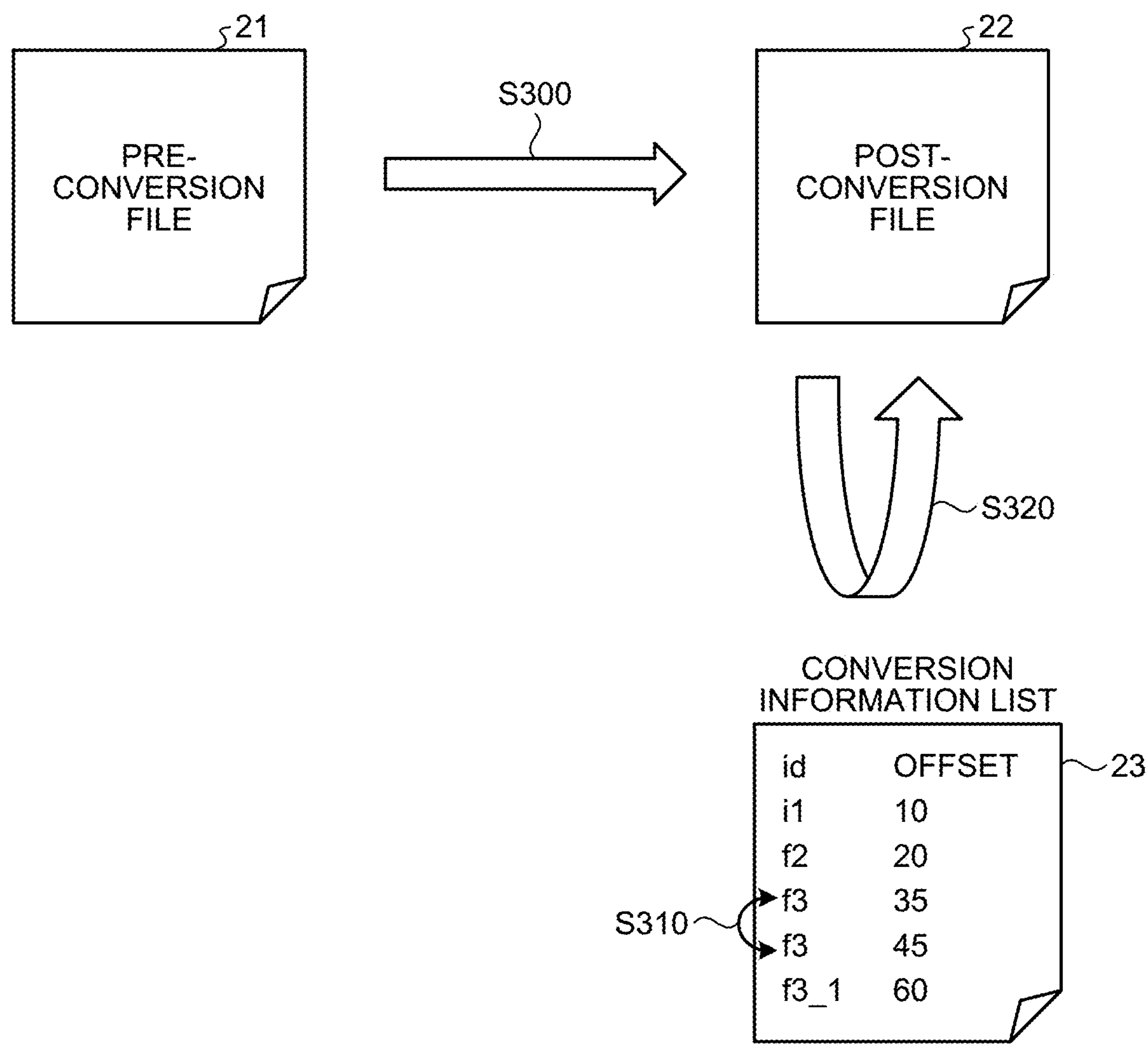
FIG. 9 is a diagram illustrating the effects of the conversion process according to the embodiment.

In the following, the effects of the conversion process performed by the conversion apparatus 1 will be described with reference to FIG. 9. FIG. 9 is a diagram illustrating the effects of the conversion process according to the embodiment. As illustrated in FIG. 9, if the identification information (id) of the data is associated with the data in the pre-conversion file 21, the conversion apparatus 1 associates the id with the format converted data and, if the id is not associated with the data in the pre-conversion file 21, the conversion apparatus 1 associates a newly generated id with the format converted data. The conversion apparatus applies this algorithm to the plurality of pieces of data included in the pre-conversion file 21 and generates the post-conversion file 22 that includes therein the plurality of pieces of format converted data associated with the plurality of pieces of the data (S300). Then, the conversion apparatus 1 refers to the relationship information (the conversion information list 23) between the id that is associated with each of the plurality of pieces of data included in the post-conversion file 22 and the position (offset) of each of the plurality of pieces of data included in the post-conversion file 22 and judges whether one of the ids is associated with the plurality of offsets included in the post-conversion file 22 (S310). Then, if one of the ids is associated with the plurality of offsets included in the post-conversion file 22, the conversion apparatus 1 changes the id associated with one of the pieces of data of the plurality of offsets from among the pieces of data included in the post-conversion file 22 (S320).

Namely, after the conversion apparatus 1 generates the post-conversion file 22 from the pre-conversion file 21, the conversion apparatus 1 refers to the conversion information list 23, performs a duplication check on the ids included in the post-conversion file 22 and updates, if duplication is present, the duplicated id included in the post-conversion file 22. Accordingly, by judging duplication of ids by using the conversion information list 23 without loading all of the pieces of data included in the pre-conversion file 21 into the memory, the conversion apparatus 1 can suppress the memory capacity needed to perform a duplication check on the id associated with the data included in the post-conversion file 22.

Furthermore, according to the embodiment described above, the conversion apparatus 1 changes the newly generated identification information from among the pieces of identification information associated with each of the plurality of pieces of data described in the plurality of positions. According to this configuration, by changing the newly generated identification information, the conversion apparatus 1 can correctly trace the data by using the identification information at the time of tracing the data from the post-conversion file 22 to the pre-conversion file 21. Namely, the conversion apparatus 1 can correctly perform the trace by using the identification information such that whether a deficiency of data is present or whether the data is correctly converted by checking the post-conversion file 22 against the pre-conversion file 21.

Furthermore, according to the embodiment described above, the conversion apparatus 1 applies the algorithm at the timing at which the plurality of pieces of data included in the pre-conversion file 21 is read out and adds the format converted data to the post-conversion file 22. Then, the conversion apparatus 1 adds the relationship between the identification information associated with the format converted data and the position of the subject data in the post-conversion file 22 to the relationship information (the conversion information list 23).

According to this configuration, the conversion apparatus 1 adds, to the conversion information list 23, the relationship between the identification information associated with the format converted data and the position of the data included in the post-conversion file 22 at the timing at which the data is read out from the pre-conversion file 21. Consequently, the conversion apparatus 1 can correctly perform the duplication check on the identification information associated with the data included in the post-conversion file 22 by loading the conversion information list 23 instead of the pre-conversion file 21 into the memory. Furthermore, the conversion apparatus 1 can suppress the memory capacity needed to perform the duplication check on the identification information associated with the data included in the post-conversion file 22.

[Programs, Etc.]

Furthermore, in the embodiment, a description has been given of a case in which, when the conversion apparatus 1 converts a file of XBRL format data of financial statements to a file of JSON format data, the conversion apparatus 1 performs duplication check on ids of the JSON format data. However, the case is not limited to this and may also be a case in which, when the conversion apparatus 1 converts a file of the XBRL format data of financial statements to a file of CSV format data, the conversion apparatus 1 performs duplication check on ids of the CSV format data. Furthermore, it may also be possible to be a case in which, when the conversion apparatus 1 converts a file of XBRL format data of financial statements to a file of XML format data, the conversion apparatus 1 performs duplication check on id of the XML format data.

Furthermore, in the embodiment, a description has been given of a case in which, when the conversion apparatus 1 converts the pre-conversion file 21 of financial statements to the post-conversion file 22, the conversion apparatus 1 performs duplication check on the ids of data in the post-conversion file 22. However, the case is not limited to financial statements and may also be a case in which, when the conversion apparatus 1 performs format conversion on electronic data with id attached, the conversion apparatus 1 performs duplication check on the ids of data included in a format converted file.

Furthermore, the conversion apparatus 1 can be implemented by mounting each of the functions of the control unit 10, the storage unit 20, and the like described above on the information processing apparatus, such as a known personal computer or a workstation.

Furthermore, each of the components in the conversion apparatus 1 illustrated in the drawings is not always physically configured as illustrated in the drawings. In other words, the specific shape of the separate or integrated conversion apparatus 1 is not limited to the drawings; however, all or part of the device can be configured by functionally or physically separating or integrating any of the units depending on various loads or use conditions. For example, the id duplication judging unit 12 and the id changing unit 13 may also be integrated as a single unit. In contrast, the format converting unit 11 may also be separated into a converting unit that performs format conversion on data and a generating unit that generates the conversion information list 23. Furthermore, the storage unit 20, such as the pre-conversion file 21, the post-conversion file 22, and the conversion information list 23, may also be connected as an external device of the conversion apparatus 1 via a network.

Figure 10:
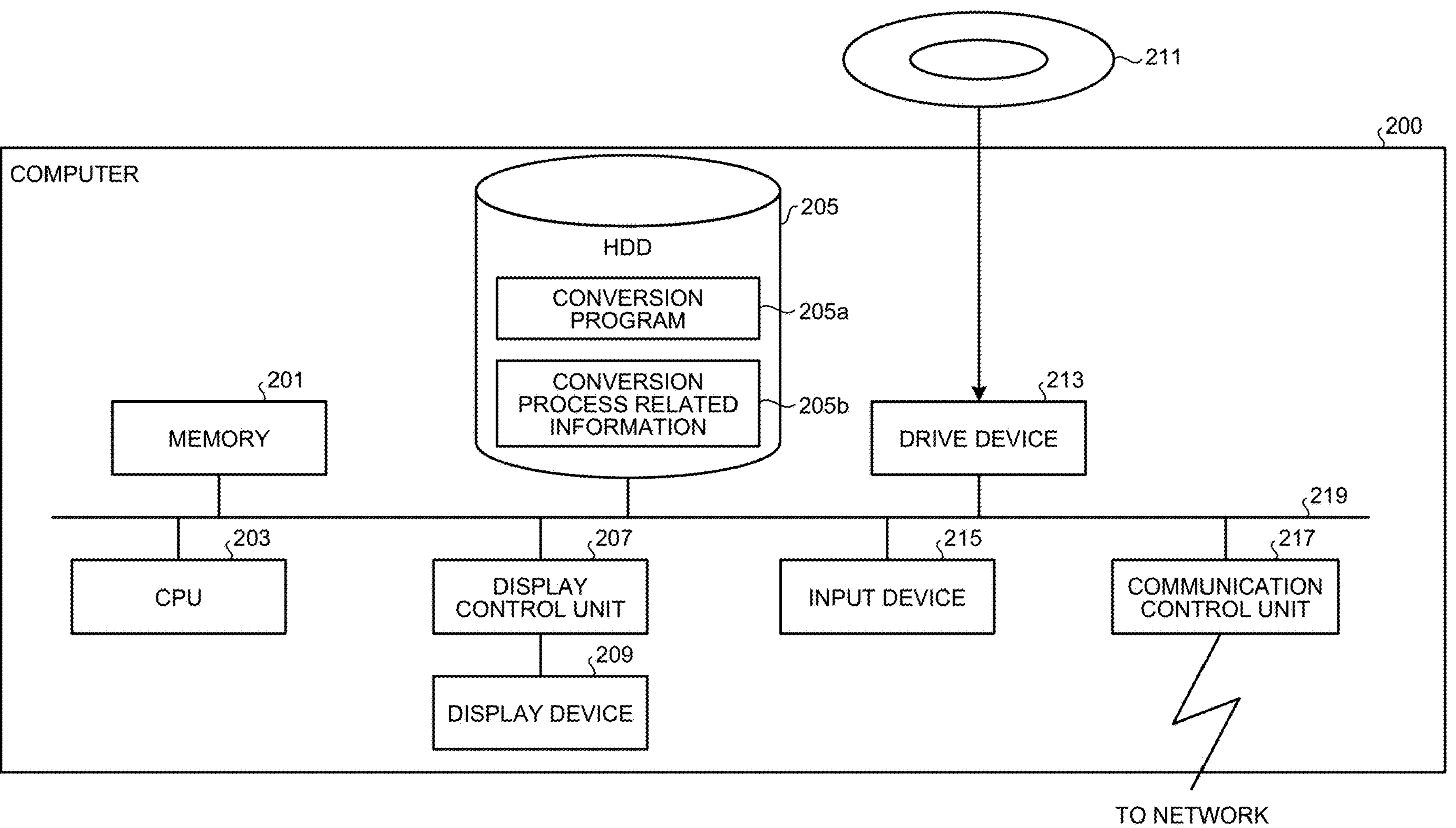
FIG. 10 is a diagram illustrating an example of a computer that executes a conversion program.

Furthermore, various kinds of processes described in the above embodiments can be implemented by executing programs prepared in advance in a computer system, such as a personal computer, a workstation, or the like. Thus, in the following, an example of a computer that executes a conversion program that implements the same function as that performed by the conversion apparatus 1 illustrated in FIG. 1 will be described. FIG. 10 is a diagram illustrating an example of a computer that executes a conversion program.

As illustrated in FIG. 10, a computer 200 includes a central processing unit (CPU) 203 that executes various kinds of arithmetic processing, an input device 215 that receives an input of data from a user, and a display control unit 207 that controls a display device 209. Furthermore, the computer 200 includes a drive device 213 that reads programs or the like from a storage medium and a communication control unit 217 that sends and receives data to and from another computer via the network. Furthermore, the computer 200 includes a memory 201 that temporarily stores therein various kinds of information and a hard disk drive (HDD) 205. Then, the memory 201, the CPU 203, the HDD 205, the display control unit 207, the drive device 213, the input device 215, and the communication control unit 217 are connected by a bus 219.

The drive device 213 is a device for, for example, a removable disk 211. The HDD 205 stores therein a conversion program 205*a* and a conversion process related information 205*b*. The CPU 203 reads the conversion program 205*a* and loads the conversion program 205*a* in the memory 201. The conversion program 205*a* functions as a conversion process.

For example, the conversion process corresponds to each of the functioning units included in the control unit 10. The conversion process related information 205*b* corresponds to the pre-conversion file 21, the post-conversion file 22, and the conversion information list 23.

Furthermore, the conversion program 205*a* does not always need to be stored in the HDD 205 from the beginning. For example, the program is stored in a "portable physical medium", such as a flexible disk (FD), a CD-ROM, a DVD disk, a magneto-optic disk, an IC CARD, or the like, that is to be inserted into the computer 200. Then, the computer 200 may also read and execute the conversion program 205*a* from the portable physical medium.

According to an aspect of an embodiment, it is possible to suppress memory capacity needed to perform a duplication check on identification information associated with format converted data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A conversion method executed by a computer, the conversion method comprising:

generating another file that includes a plurality of pieces of format converted data associated with a plurality of pieces of data by applying an algorithm to the plurality of pieces of data included in a file, a process of the algorithm including:

associating, when identification information of pre-format-conversion data is associated with data in the plurality of pieces of data, the identification information with format converted data corresponding to the data; and associating, when the identification information is not associated, newly generated identification information with the format converted data;

determining, by referring to relationship information between the identification information associated with each of the plurality of pieces of data included in the another file and a position of each of the plurality of pieces of data in the another file, whether one of the plurality of pieces of identification information is associated with a plurality of positions in the another file; and changing, when one of the plurality of pieces of identification information is associated with the plurality of positions in the another file, the identification information associated with one of the pieces of data at the plurality of positions from among the plurality of pieces of data included in the another file.

2. The conversion method according to claim 1, wherein the changing includes changing the newly generated identification information from among the identification information associated with each of the plurality of pieces of data described at the plurality of positions.

3. The conversion method according to claim 1, wherein the generating includes adding, by applying the algorithm at a timing at which each of the plurality of pieces of data included in the file is read out, the format converted data to the another file and adding a relationship between the identification information associated with the format converted data and the position of the data in the another file to the relationship information.

4. The conversion method according to claim 1, wherein the file is in an XBRL format and the another file is in a JSON format.

5. A conversion apparatus comprising:

a memory; and a processor coupled to the memory and configured to:

generate another file that includes a plurality of pieces of format converted data associated with a plurality of pieces of data by applying an algorithm to the plurality of pieces of data included in a file, a process of the algorithm including:

associating, when identification information of pre-format-conversion data is associated with data in the plurality of pieces of data, the identification information with format converted data corresponding to the data; and associating, when the identification information is not associated, newly generated identification information with the format converted data;

determine, by referring to relationship information between the identification information associated with each of the plurality of pieces of data included in the another file and a position of each of the plurality of pieces of data in the another file, whether one of the plurality of pieces of identification information is associated with a plurality of positions in the another file, and change, when one of the plurality of pieces of identification information is associated with the plurality of positions in the another file, the identification information associated with one of the pieces of data at the plurality of positions from among the plurality of pieces of data included in the another file.

6. A non-transitory computer-readable recording medium storing therein a conversion program that causes a computer to execute a process, the process comprising:

generating another file that includes a plurality of pieces of format converted data associated with a plurality of pieces of data by applying an algorithm to the plurality of pieces of data included in a file, a process of the algorithm including:

associating, when identification information of pre-format-conversion data is associated with data in the plurality of pieces of data, the identification information with format converted data corresponding to the data; and associating, when the identification information is not associated, newly generated identification information with the format converted data;

determining, by referring to relationship information between the identification information associated with each of the plurality of pieces of data included in the another file and a position of each of the plurality of pieces of data in the another file, whether one of the plurality of pieces of identification information is associated with a plurality of positions in the another file; and changing, when one of the plurality of pieces of identification information is associated with the plurality of positions in the another file, the identification information associated with one of the pieces of data at the plurality of positions from among the plurality of pieces of data included in the another file.

* * * * *